United States Patent
Misawa

(10) Patent No.: US 12,403,789 B2
(45) Date of Patent: Sep. 2, 2025

(54) ELECTRICALLY POWERED VEHICLE AND METHOD OF CONTROLLING CHARGING OF ELECTRICALLY POWERED VEHICLE

(71) Applicant: TOYOTA JIDOSHA KABUSHIKI KAISHA, Aichi-ken (JP)

(72) Inventor: Takahiro Misawa, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 778 days.

(21) Appl. No.: 17/692,178

(22) Filed: Mar. 11, 2022

(65) Prior Publication Data

US 2022/0289058 A1    Sep. 15, 2022

(30) Foreign Application Priority Data

Mar. 15, 2021    (JP) ................. 2021-041589

(51) Int. Cl.
    *B60L 53/62*      (2019.01)
    *B60L 50/62*      (2019.01)

(52) U.S. Cl.
    CPC .............. *B60L 53/62* (2019.02); *B60L 50/62* (2019.02)

(58) Field of Classification Search
    CPC ................................ B60L 53/62; B60L 50/62
    See application file for complete search history.

(56) References Cited

U.S. PATENT DOCUMENTS

| | | | |
|---|---|---|---|
| 10,377,250 B2 | 8/2019 | Lee et al. | |
| 2013/0038273 A1* | 2/2013 | Riggio | B60L 53/22<br>320/107 |
| 2013/0127413 A1 | 5/2013 | Ohtomo | |
| 2018/0138730 A1 | 5/2018 | Fuchs et al. | |
| 2018/0354374 A1 | 12/2018 | Lee et al. | |
| 2019/0070971 A1* | 3/2019 | Kusumi | H02J 7/1415 |
| 2019/0241085 A1 | 8/2019 | Hiroe | |
| 2020/0106320 A1 | 4/2020 | Okamoto et al. | |
| 2020/0361323 A1 | 11/2020 | Chon et al. | |

FOREIGN PATENT DOCUMENTS

| | | |
|---|---|---|
| CN | 110120689 A | 8/2019 |
| EP | 3521098 A1 | 8/2019 |
| JP | 2007-295718 A | 11/2007 |
| JP | 2010166790 A | 7/2010 |
| JP | 2013-110816 A | 6/2013 |
| JP | 201914677 A | 3/2019 |
| JP | 201947677 A | 3/2019 |
| JP | 2019-140721 A | 8/2019 |
| JP | 202018078 A | 1/2020 |
| JP | 2020018078 * | 1/2020 |
| JP | 2020-058131 A | 4/2020 |

* cited by examiner

*Primary Examiner* — Richard V Muralidar
(74) *Attorney, Agent, or Firm* — HAUPTMAN HAM, LLP

(57) ABSTRACT

An output voltage obtaining unit receives information from an external charging facility and obtains a maximum output voltage of the external charging facility from that information. An upper limit voltage calculator calculates a battery voltage which is an inter-terminal voltage at the time of end of charging of a battery. A switching unit receives a result of comparison from a comparator. When relation of Vc≥VBu is satisfied in the result of comparison, the switching unit switches a charging relay to connect a DC inlet to a power line and a power line. When relation of Vc<VBu is satisfied, the switching unit switches the charging relay to connect the DC inlet to a bypass power line and a bypass power line.

15 Claims, 9 Drawing Sheets

ELECTRICALLY POWERED VEHICLE AND METHOD OF CONTROLLING CHARGING OF ELECTRICALLY POWERED VEHICLE

This nonprovisional application is based on Japanese Patent Application No. 2021-041589 filed with the Japan Patent Office on Mar. 15, 2021, the entire contents of which are hereby incorporated by reference.

BACKGROUND

Field

The present disclosure relates to an electrically powered vehicle and particularly to an electrically powered vehicle including a power storage device chargeable by an external power supply and a method of controlling charging of an electrically powered vehicle.

Description of the Background Art

An electrically powered vehicle such as a battery electric vehicle or a plug-in hybrid electric vehicle has recently widely been used. Such an electrically powered vehicle incorporates a power storage device chargeable with electric power supplied from an external power supply. Charging of a power storage device with electric power supplied from an external power supply is also referred to as "external charging" below.

For example, Japanese Patent Laying-Open No. 2019-047677 discloses charging of a power storage device with a booster in accordance with a highest voltage provided from an external charger (a charging stand or the like) representing an external power supply.

The electrically powered vehicle disclosed in Japanese Patent Laying-Open No. 2019-047677 incorporates a power storage device adapted to an ultra high voltage (for example, 800 V). A highest voltage Vmax of electric power provided from a charging stand is compared with a predetermined reference voltage Vref. When highest voltage Vmax is equal to or lower than reference voltage Vref, an external charging mode is set to a high voltage charging mode. When highest voltage Vmax is higher than reference voltage Vref, the external charging mode is set to an ultra high voltage charging mode.

When the external charging mode is set to the high voltage charging mode, a high voltage supplied from the charging stand is boosted to an ultra high voltage (800 V) by the booster. The power storage device is charged with electric power of the boosted voltage. When the external charging mode is set to the ultra high voltage charging mode, the voltage of electric power supplied from the charging stand is ultra high (800 V), and not boosted by the booster. The power storage device is charged with electric power of the voltage that has not been boosted.

An inter-terminal voltage of the power storage device mounted on the electrically powered vehicle varies depending on a state of charge (SOC) of the power storage device. Typically, the inter-terminal voltage lowers with lowering in SOC. In the electrically powered vehicle disclosed in Japanese Patent Laying-Open No. 2019-047677, reference voltage Vref is fixed (for example, 500 V). Therefore, when highest voltage Vmax of the charging stand is equal to or lower than reference voltage Vref in spite of the inter-terminal voltage being lower than reference voltage Vref due to the low SOC of the power storage device, the high voltage charging mode is set. Then, the power storage device is charged with electric power of the voltage boosted by the booster. Thus, in the electrically powered vehicle in Japanese Patent Laying-Open No. 2019-047677, even when the power storage device can be charged without the use of the booster, the booster is activated. Then, the power storage device may be charged with electric power of the boosted voltage. Since a boost operation by the booster leads to power loss, efficiency in charging may be lowered when the power storage device is charged while the booster is active.

SUMMARY

The present disclosure was made to solve problems above, and an object thereof is to carry out external charging in which lowering in efficiency in charging can be suppressed in an electrically powered vehicle including a power storage device chargeable by an external power supply.

An electrically powered vehicle according to the present disclosure is an electrically powered vehicle including a power storage device chargeable with electric power supplied from an external power supply. The electrically powered vehicle includes a boost device, a bypass path, and a controller. The boost device boosts a voltage of the electric power supplied from the external power supply and supplies electric power of the boosted voltage to the power storage device. The bypass path is configured to bypass the boost device and configured as a path through which the electric power supplied from the external power supply is supplied to the power storage device without being supplied to the boost device. The controller controls charging of the power storage device. The controller is configured to charge the power storage device by using the boost device when a maximum voltage of the electric power supplied from the external power supply is lower than an inter-terminal voltage of the power storage device at the time of end of charging of the power storage device and to charge the power storage device through the bypass path when the maximum voltage is higher than the inter-terminal voltage at the time of end of charging.

According to this configuration, when the power storage device can be charged without activation of the boost device owing to the maximum voltage of electric power supplied from the external power supply being higher than the inter-terminal voltage at the time of end of charging of the power storage device, the power storage device is charged through the bypass path. Therefore, the power storage device can be charged without loss in the boost device and lowering in efficiency in charging can be suppressed.

Preferably, the controller is configured to charge the power storage device by using the boost device when the power storage device is being charged through the bypass path and the maximum voltage becomes lower than the inter-terminal voltage of the power storage device.

When the maximum voltage becomes lower than the inter-terminal voltage due to variation in inter-terminal voltage while the power storage device is being charged without the use of the boost device owing to the maximum voltage being higher than the inter-terminal voltage at the time of end of charging, charging is not carried out. According to this configuration, when the maximum voltage of electric power supplied from the external power supply becomes lower than the inter-terminal voltage of the power storage device and charging can no longer be carried out while the power storage device is being charged without the use of the boost device, the boost device is activated. The power storage device is thus charged with electric power of the voltage boosted by the boost device. Consequently, the power storage device can reliably be charged.

Preferably, the controller is configured to charge the power storage device through the bypass path when the maximum voltage is lower than the inter-terminal voltage at the time of end of charging and a difference between the maximum voltage and the inter-terminal voltage at the time of end of charging is smaller than a first prescribed value.

When the boost device is activated, efficiency in charging may be lowered due to power loss brought about by activation of the boost device and a time period for charging may become longer. When the difference between the maximum voltage and the inter-terminal voltage at the time of end of charging is smaller than the first prescribed value even though the maximum voltage of electric power supplied from the external power supply is lower than the inter-terminal voltage at the time of end of charging of the power storage device, charging is carried out without the use of the boost device. Consequently, a time period for charging can be prevented from becoming longer.

Preferably, the controller is configured to charge the power storage device by using the boost device when the maximum voltage is higher than the inter-terminal voltage at the time of end of charging and a difference between the maximum voltage and the inter-terminal voltage at the time of end of charging is smaller than a second prescribed value.

When the maximum voltage becomes lower than the inter-terminal voltage due to variation in inter-terminal voltage while the power storage device is being charged without the use of the boost device owing to the maximum voltage being higher than the inter-terminal voltage at the time of end of charging, charging may not be carried out, an originally scheduled time period for charging after start of charging with the use of the boost device may become longer, or charging may become unstable. When the difference between the maximum voltage and the inter-terminal voltage at the time of end of charging is smaller than the second prescribed value even though the maximum voltage is higher than the inter-terminal voltage at the time of end of charging, the power storage device is charged by using the boost device. A frequency of a charging voltage becoming lower than the inter-terminal voltage can thus be decreased. Consequently, stable charging can be facilitated.

Preferably, the external power supply is an external charging facility that supplies direct-current (DC) electric power to the electrically powered vehicle. The electrically powered vehicle includes a charging relay configured to selectively switch a path for the DC electric power supplied from the external charging facility to a path through which the DC electric power is supplied to the boost device or the bypass path. The controller includes an output voltage obtaining unit, an upper limit voltage calculator, a comparator, and a switching unit. The output voltage obtaining unit obtains the maximum voltage of the electric power supplied from the external power supply and obtains the maximum voltage based on information received from the external charging facility. The upper limit voltage calculator calculates the inter-terminal voltage of the power storage device at the time of end of charging of the power storage device and calculates the inter-terminal voltage based on an SOC of the power storage device. The comparator compares magnitude of the maximum voltage with magnitude of the inter-terminal voltage at the time of end of charging. The switching unit switches the charging relay in accordance with a result of comparison by the comparator.

According to this configuration, the charging relay is switched in accordance with a result of comparison between the maximum voltage obtained based on information received from the external charging facility and the inter-terminal voltage at the time of end of charging determined based on the SOC of the power storage device at the time of end of charging. The power storage device can thus be charged without loss in the boost device. Consequently, lowering in efficiency in charging can be suppressed.

A charging control method in the present disclosure is a method of controlling charging of an electrically powered vehicle. The electrically powered vehicle includes a power storage device and a boost device. The power storage device is configured to be chargeable by an external power supply provided outside the electrically powered vehicle. The boost device boosts a voltage of electric power supplied from the external power supply and supplies electric power of the boosted voltage to the power storage device. The charging control method includes comparing a maximum voltage of the electric power supplied from the external power supply with an inter-terminal voltage of the power storage device at the time of end of charging of the power storage device, charging the power storage device by activating the boost device when the maximum voltage is lower than the inter-terminal voltage at the time of end of charging, and charging the power storage device without activating the boost device when the maximum voltage is higher than the inter-terminal voltage at the time of end of charging.

According to this charging control method, when the power storage device can be charged without the use of the boost device owing to the maximum voltage of electric power supplied from the external power supply being higher than the inter-terminal voltage at the time of end of charging of the power storage device, the power storage device is charged through the bypass path. Therefore, the power storage device can be charged without loss in the boost device. Consequently, lowering in efficiency in charging can be suppressed.

Preferably, the charging control method further includes calculating the inter-terminal voltage at the time of end of charging of the power storage device based on an SOC at the time of end of charging.

An amount of charging of the power storage device can freely be set, for example, in accordance with a time period for charging, an amount of charging electric power, and/or a charging completion SOC. The inter-terminal voltage at the time of end of charging of the power storage device is determined by the SOC at the time of end of charging. Therefore, when the SOC at the time of end of charging is determined in accordance with information on the time period for charging, the amount of charging electric power, and/or the charging completion SOC, the inter-terminal voltage at the time of end of charging can be calculated.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
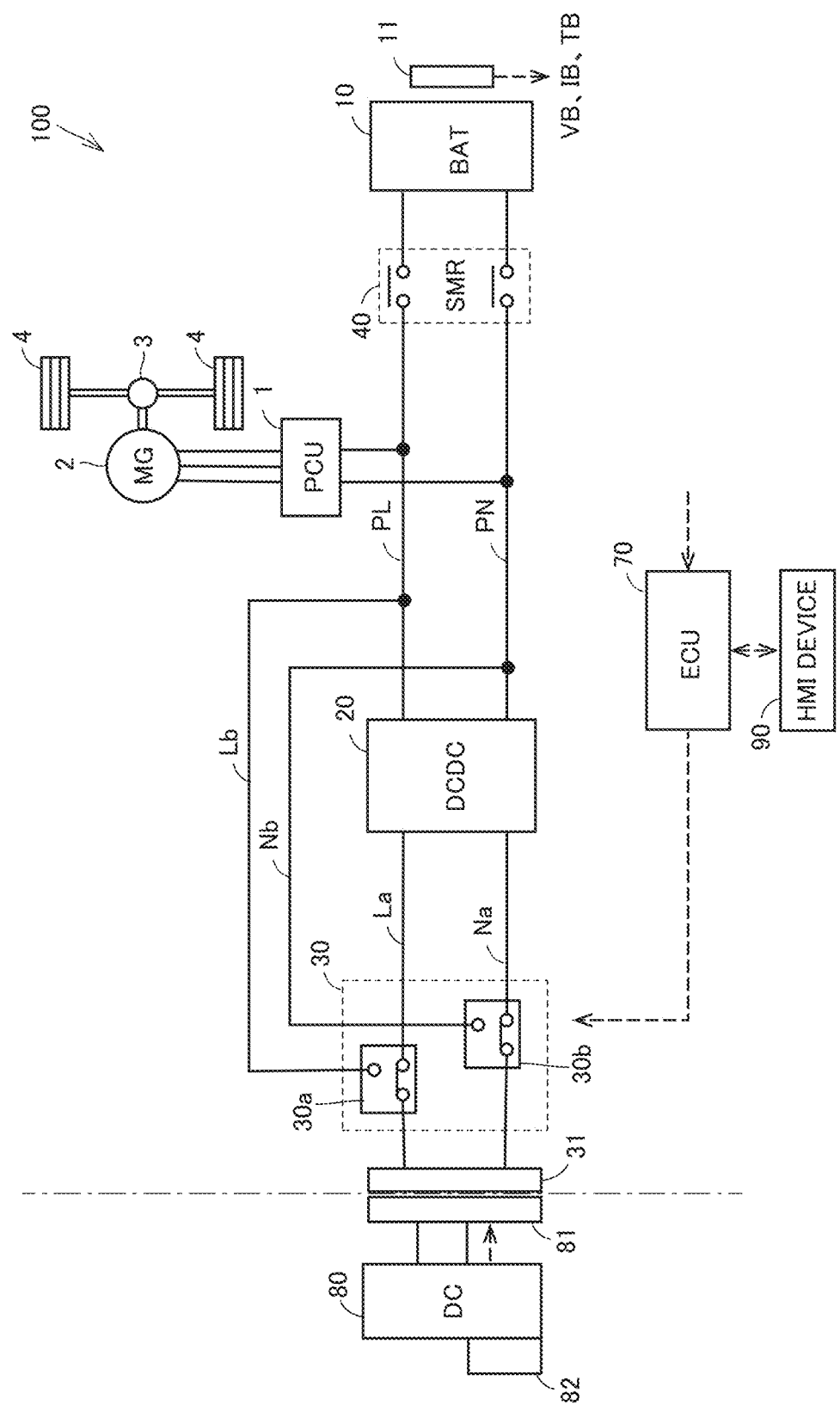
FIG. 1 is a diagram of an overall configuration of an electrically powered vehicle according to the present embodiment.

An embodiment of the present disclosure will be described in detail below with reference to the drawings. The same or corresponding elements in the drawings have the same reference characters allotted and description thereof will not be repeated.

FIG. 1 is a diagram of an overall configuration of an electrically powered vehicle according to the present embodiment. In the present embodiment, an electrically powered vehicle 100 is, for example, a battery electric vehicle. Electrically powered vehicle 100 includes a power control unit (PCU) 1, a motor generator (MG) 2 which is a rotating electric machine, a power transmission gear 3, a drive wheel 4, a battery 10 representing an exemplary power storage device, a monitoring unit 11, a system main relay (SMR) 40, and an electronic control unit (ECU) 70 representing an exemplary controller.

MG 2 is implemented, for example, by an interior permanent magnet synchronous motor (IPM motor), and performs a function as an electric motor (motor) and a function as an electric power generator (generator). Output torque of MG 2 is transmitted to drive wheel 4 through power transmission gear 3 including a reduction gear, a differential, and the like.

During braking of electrically powered vehicle 100, drive wheel 4 drives MG 2, and MG 2 operates as the electric power generator. MG 2 thus functions also as a braking apparatus that carries out regenerative braking for converting kinetic energy of electrically powered vehicle 100 into electric power. Regenerated electric power generated from regenerative braking force in MG 2 is stored in battery 10.

PCU 1 is a power conversion device that bidirectionally converts electric power between MG 2 and battery 10. PCU 1 includes, for example, an inverter and a converter that operate based on a control signal from ECU 70.

During discharging of battery 10, the converter boosts a voltage supplied from battery 10 and supplies the boosted voltage to the inverter. The inverter converts DC electric power supplied from the converter to alternating-current (AC) electric power and drives MG 2 with resultant electric power.

During charging of battery 10, on the other hand, the inverter converts AC electric power generated by MG 2 to DC electric power and supplies resultant electric power to the converter. The converter lowers the voltage supplied from the inverter to a voltage suitable for charging of battery 10 and supplies the lowered voltage to battery 10.

PCU 1 stops charging and discharging by stopping operations of the inverter and the converter based on a control signal from ECU 70. The converter does not have to be provided in PCU 1.

SMR 40 is electrically connected to a power line PL and a power line PN. Power line PL and power line PN are configured to connect battery 10 to PCU 1. When SMR 40 is closed (ON) (that is, in a conducting state) in accordance with a control signal from ECU 70, electric power can be supplied and received between battery 10 and PCU 1. When SMR 40 is opened (OFF) (that is, in a disconnected state) in accordance with a control signal from ECU 70, electrical connection between battery 10 and PCU 1 is cut off. In external charging of battery 10, SMR 40 is closed (ON) in accordance with a signal from ECU 70.

Electric power for driving MG 2 is stored in battery 10. Battery 10 is a rechargeable DC power supply (secondary battery). A plurality of cells (battery cells) are stacked in battery 10, and for example, these cells are electrically connected in series. The cell may be a lithium ion battery or a nickel metal hydride battery. Battery 10 may be substituted with a power storage device such as an electric double layer capacitor.

Monitoring unit 11 includes a voltage sensor, a current sensor, and a temperature sensor (none of which is shown). The voltage sensor detects a voltage VB across terminals of battery 10. The current sensor detects a current IB which is an input and output current to and from battery 10. The temperature sensor detects a temperature TB of battery 10. Each sensor provides a result of detection to ECU 70.

Electrically powered vehicle 100 includes a DC inlet 31. Quick charging of battery 10 can be carried out by using an external DC power supply which is a charging facility. DC inlet 31 is configured to be connected to a connector 81 provided at a tip end of a charging cable of external DC power supply (external charging facility) 80.

Charging relay 30 is electrically connected to a power line La and a power line Na. Power line La and power line Na are configured to connect DC inlet 31 to a boost converter (DCDC converter) 20 which is a boost device. Charging relay 30 includes, for example, a c contact relay 30a and a c contact relay 30b. c contact relay 30a is configured to be connected to power line La and a bypass power line Lb. Bypass power line Lb is connected to power line PL as bypassing boost converter 20. c contact relay 30b is configured to be connected to power line Na and a bypass power line Nb. Bypass power line Nb is connected to power line PN as bypassing boost converter 20. Charging relay 30 selectively switches an electric power path between DC inlet 31 and boost converter 20 in accordance with a control signal from ECU 70. When charging relay 30 is switched to connect DC inlet 31 to power line La and power line Na, electric power of the voltage boosted by boost converter 20 is supplied to battery 10 through power line PL and power line PN. Battery 10 is thus charged. When charging relay 30 is switched to connect DC inlet 31 to bypass power line Lb and bypass power line Nb, electric power supplied from external charging facility 80 is not boosted by boost converter 20. In other words, electric power supplied from external charging facility 80 is directly supplied to battery 10. Battery 10 is thus charged.

Boost converter 20 is, for example, a non-insulating boost converter. Boost converter 20 boosts a voltage of electric power (DC electric power) supplied to power line La and power line Na and provides electric power (DC electric power) of the boosted voltage to power line PL and power line PN. Boost converter 20 may be an insulating boost converter.

External charging facility 80 converts AC electric power from a grid power supply (for example, a commercial power supply) to DC electric power. External charging facility 80 is configured to provide charging electric power from connector 81 through the charging cable to electrically powered vehicle 100. An operation panel 82 is provided in external charging facility 80. Various operations can thus be performed onto external charging facility 80.

When connector 81 of external charging facility 80 is connected to DC inlet 31, a signal line (not shown) in addition to the power line is connected. Such connection allows communication between external charging facility 80 and ECU 70 through controller area network (CAN) communication and/or power line communication (PLC).

An HMI device 90 provides a user with information for assisting operations of electrically powered vehicle 100. HMI device 90 is representatively a display provided in a compartment, and it includes, for example, also a speaker. HMI device 90 also serves as a touch screen operable by the user. The user can enter charging request information including time to start charging of battery 10 and an amount of charging to HMI device 90, for example, by touching a touch panel.

ECU 70 includes a central processing unit (CPU) and a memory. The memory includes a read only memory (ROM) and a random access memory (RAM). ECU 70 controls each device such that electrically powered vehicle 100 is in a desired state based on a signal received from monitoring unit 11, signals from various sensors (not shown), and information such as a map and a program stored in the memory. Signals from the various sensors include an accelerator position signal and a vehicle speed signal. ECU 70 calculates the SOC of battery 10 based on a detection value of an input and output current to and from battery 10 and/or a voltage of battery 10 from monitoring unit 11. The SOC of battery 10 represents an amount of power storage in battery 10, and it is expressed, for example, by a percentage as a current amount of power storage to a full charge capacity of battery 10.

In the present embodiment, an inter-terminal voltage (a rated voltage or a nominal voltage) of battery 10 is set, for example, to 600 V. Though specifications of external charging facility 80 as a charging infrastructure are defined under international standards, there are various specifications for a maximum output voltage of external charging facility 80. For example, when battery 10 in the present embodiment is charged by using the external charging facility having a maximum output voltage of 400 V, a boost converter has conventionally been used to charge battery 10. In other words, the boost converter boosts 400 V, which is a voltage of electric power supplied from the external charging facility, to 600 V, and battery 10 is charged with electric power of the boosted voltage. When battery 10 in the present embodiment is charged by using the external charging facility having a maximum output voltage of 800 V, battery 10 has conventionally been charged without activation of boost converter 20.

A boost operation by boost converter 20 causes loss such as switching loss and conduction loss. When 400 V, which is a voltage of electric power supplied from external charging facility 80, is boosted to 600 V and then charging is carried out, efficiency in charging is lowered. The inter-terminal voltage of battery 10 varies depending on the SOC. With lowering in SOC, the inter-terminal voltage lowers.

Therefore, when the SOC at the time of end of charging is low, the inter-terminal voltage of battery 10 at the time of end of charging may become equal to or lower than 400 V. Therefore, in external charging by using the charging facility having a maximum output voltage of 400 V, depending on the inter-terminal voltage of battery 10 at the time of end of charging, battery 10 can be charged without the use of the boost function of boost converter 20.

In the present embodiment, a battery voltage VBu which represents the inter-terminal voltage of battery 10 at the time of end of charging of battery 10 is determined in accordance with the SOC at the time of end of charging of battery 10. Battery voltage VBu is compared with a maximum output voltage Vc of external charging facility 80. Then, when maximum output voltage Vc is lower than battery voltage VBu, maximum output voltage Vc of external charging facility 80 is boosted by boost converter 20 and battery 10 is charged. When maximum output voltage Vc is higher than battery voltage VBu, battery 10 is charged without activation of boost converter 20.

Figure 2:
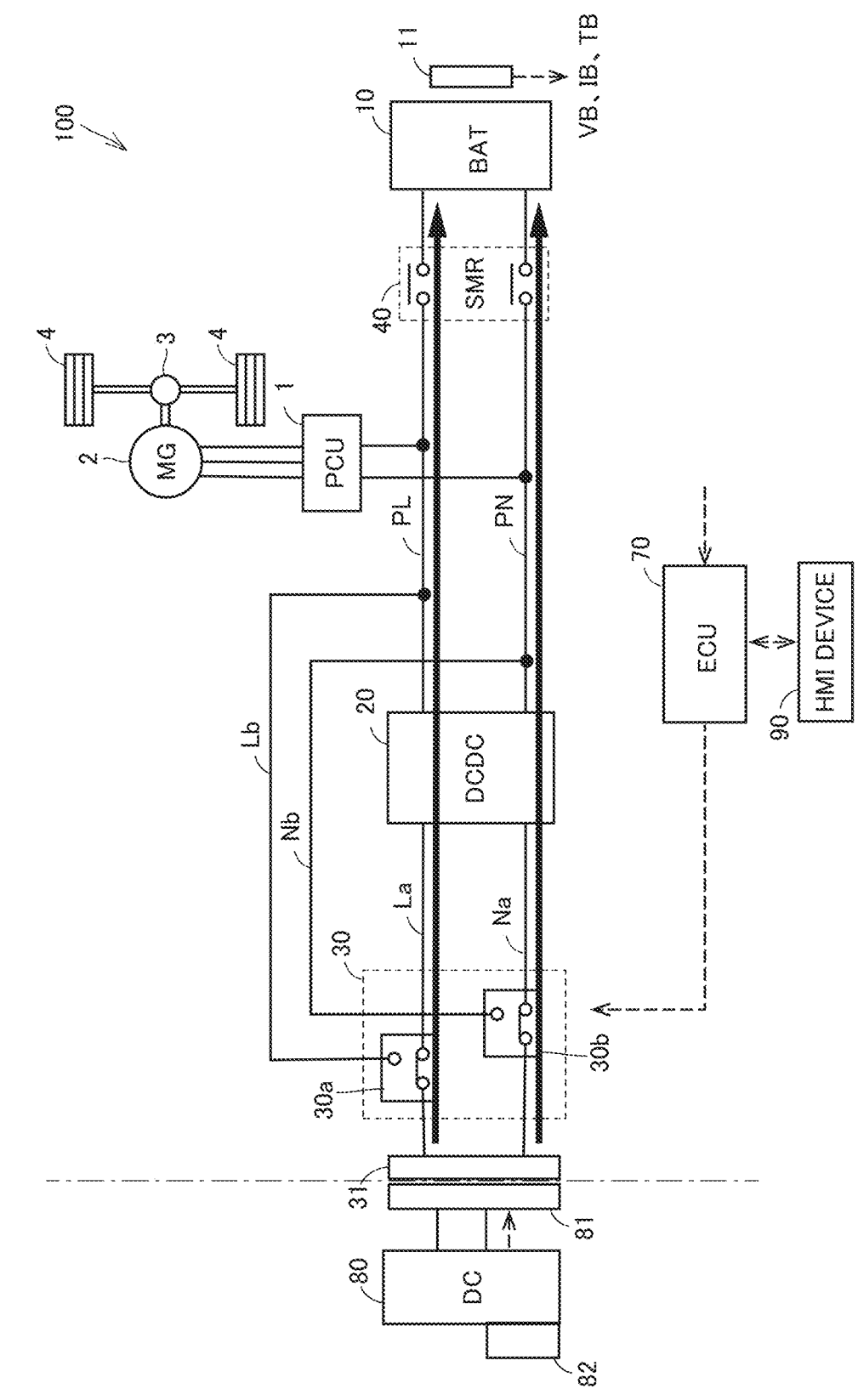
FIG. 2 is a diagram showing a flow of charging electric power when a maximum output voltage Vc is lower than a battery voltage VBu.

FIG. 2 is a diagram showing a flow of charging electric power when maximum output voltage Vc is lower than battery voltage VBu. When maximum output voltage Vc is lower than battery voltage VBu, charging relay 30 is switched to connect DC inlet 31 to power line La and power line Na as shown with arrows in FIG. 2. Electric power of the voltage boosted by boost converter 20 is thus supplied to battery 10. Consequently, battery 10 is charged.

Figure 3:
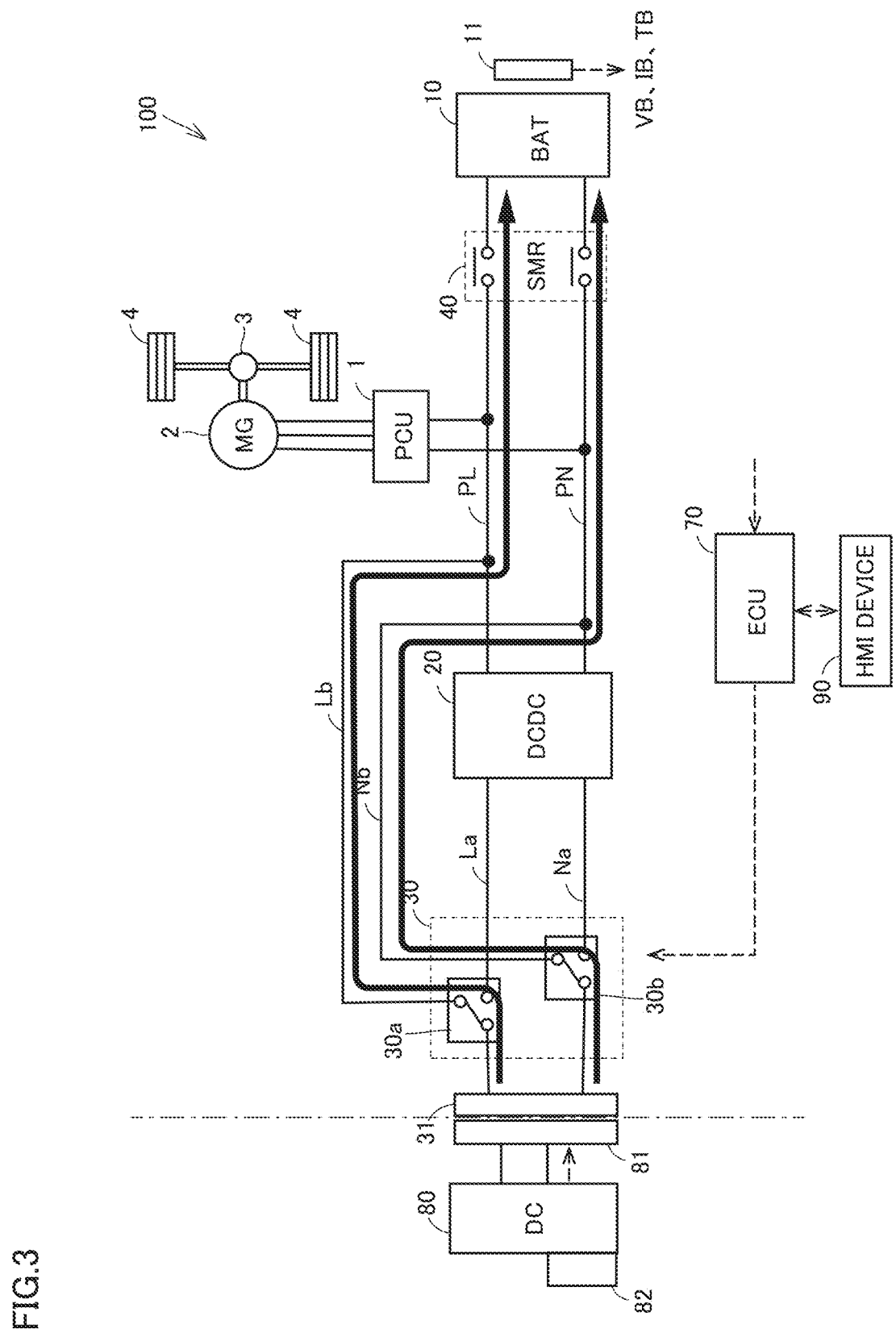
FIG. 3 is a diagram showing a flow of charging electric power when maximum output voltage Vc is higher than battery voltage VBu.

FIG. 3 is a diagram showing a flow of charging electric power when maximum output voltage Vc is higher than battery voltage VBu. When maximum output voltage Vc is higher than battery voltage VBu, charging relay 30 is switched to connect DC inlet 31 to bypass power line Lb and bypass power line Nb as shown with arrows in FIG. 3. Battery 10 is thus charged through the bypass path (bypass power line Lb and bypass power line Nb) that bypasses boost converter 20. In other words, since electric power supplied from external charging facility 80 is supplied to battery 10 through the bypass path without being supplied to boost converter 20, battery 10 is charged without boost of the voltage of electric power from external charging facility 80 by boost converter 20.

Figure 4:
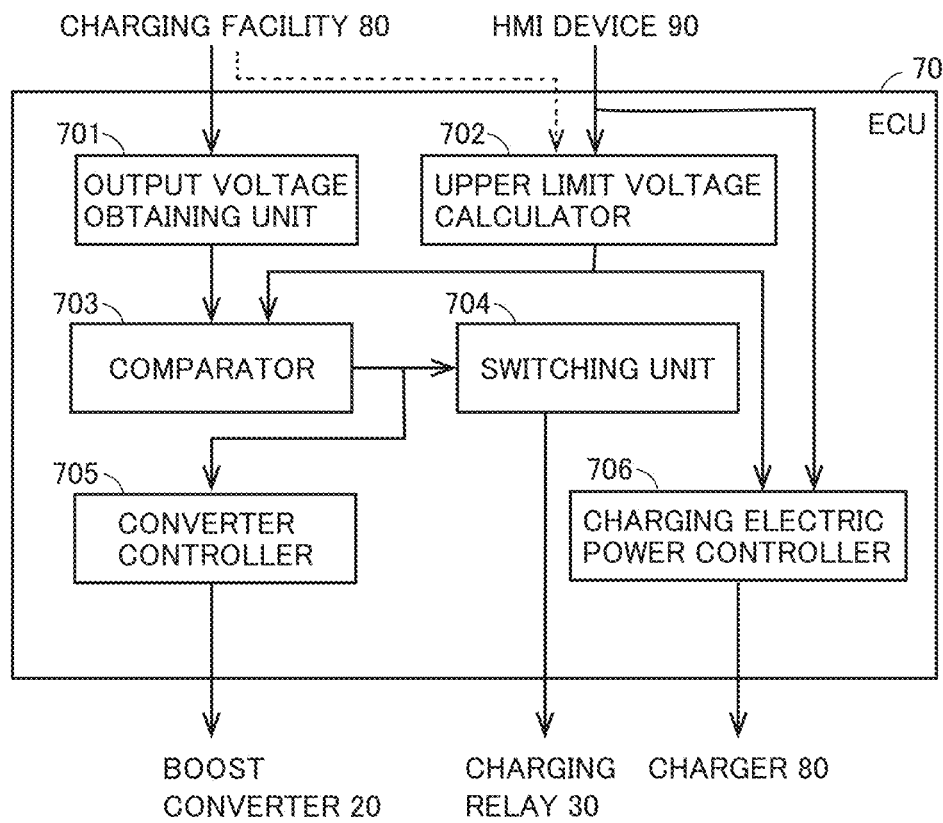
FIG. 4 is a diagram showing a functional block configured within an ECU 70.

FIG. 4 is a diagram showing a functional block configured within ECU 70. Each functional block is implemented by hardware of ECU 70 and software processing performed by a program. An output voltage obtaining unit 701 receives information from external charging facility 80 through CAN communication and/or PLC. Output voltage obtaining unit 701 obtains maximum output voltage Vc of external charging facility 80 based on this information. Maximum output voltage Vc is a maximum voltage that can be provided from external charging facility 80 in a stable manner, and a rated output voltage may be adopted as the maximum output voltage. Maximum output voltage Vc corresponds to the "maximum voltage" in the present disclosure.

An upper limit voltage calculator 702 calculates battery voltage VBu which represents the inter-terminal voltage at the time of end of charging of battery 10. The inter-terminal voltage of battery 10 varies depending on the SOC. With increase in SOC, the inter-terminal voltage increases, and with lowering in SOC, the inter-terminal voltage lowers. In the present embodiment, upper limit voltage calculator 702 calculates battery voltage VBu based on the SOC at the time of end of charging of battery 10. An amount of charging of battery 10 can freely be set by a user. For example, the user may set a time period for charging of battery 10 or an amount of charging (Ah) of battery 10 by operating HMI device 90 or operation panel 82. When the time period for charging is set, the amount of charging (Ah) is calculated in accordance with a charging current (A) provided from external charging facility 80 and the time period for charging. The SOC at the time of end of charging is calculated in accordance with the calculated amount of charging (Ah) and the SOC of battery 10 at the time of start of charging. When the amount of charging (Ah) is set, the SOC at the time of end of charging is calculated in accordance with the amount of charging (Ah) and the SOC of battery 10 at the time of start of charging.

The amount of charging of battery 10 may be determined based on the SOC at the time of completion of charging. In this case, the SOC at the time of completion of charging is set by an operation onto HMI device 90 and it can be used as the SOC at the time of end of charging of battery 10. Upper limit voltage calculator 702 obtains the SOC at the time of end of charging of battery 10 based on the amount of charging set by using HMI device 90 or operation panel 82. Upper limit voltage calculator 702 may determine battery voltage VBu in accordance with a map that shows relation between the SOC and the inter-terminal voltage. The map that shows relation between the SOC and the inter-terminal voltage is prepared through experiments or the like in advance and stored in the memory.

A comparator 703 compares magnitude of maximum output voltage Vc obtained by output voltage obtaining unit 701 with magnitude of battery voltage VBu calculated by upper limit voltage calculator 702. Comparator 703 provides the result of comparison to a switching unit 704 and a converter controller 705.

Switching unit 704 receives the result of comparison from comparator 703, and switches charging relay 30 based on the result of comparison. When maximum output voltage Vc is lower than battery voltage VBu (Vc<VBu), switching unit 704 switches charging relay 30 to connect DC inlet 31 to power line La and power line Na (see FIG. 2). When maximum output voltage Vc is equal to or higher than battery voltage VBu (Vc≥VBu), switching unit 704 switches charging relay 30 to connect DC inlet 31 to bypass power line Lb and bypass power line Nb (see FIG. 3).

Converter controller 705 receives the result of comparison from the comparator. When maximum output voltage Vc is lower than battery voltage VBu (Vc<VBu) in the result of comparison, converter controller 705 activates boost converter 20 simultaneously with start of charging of battery 10.

A charging current controller 706 controls, for example, start and end of charging of battery 10. By way of example, when two-way authentication between the electrically powered vehicle and external charging facility 80 is successful, charging current controller 706 transmits a request for output of charging electric power to external charging facility 80 to thereby start charging of battery 10. When a set time period for charging has elapsed since start of charging, when charging by a set amount of charge (Ah) is done, or when the SOC of battery 10 attains to an SOC at the time of completion of charging, charging current controller 706 transmits a request for stopping charging electric power to external charging facility 80 to thereby quit charging.

Figure 5:
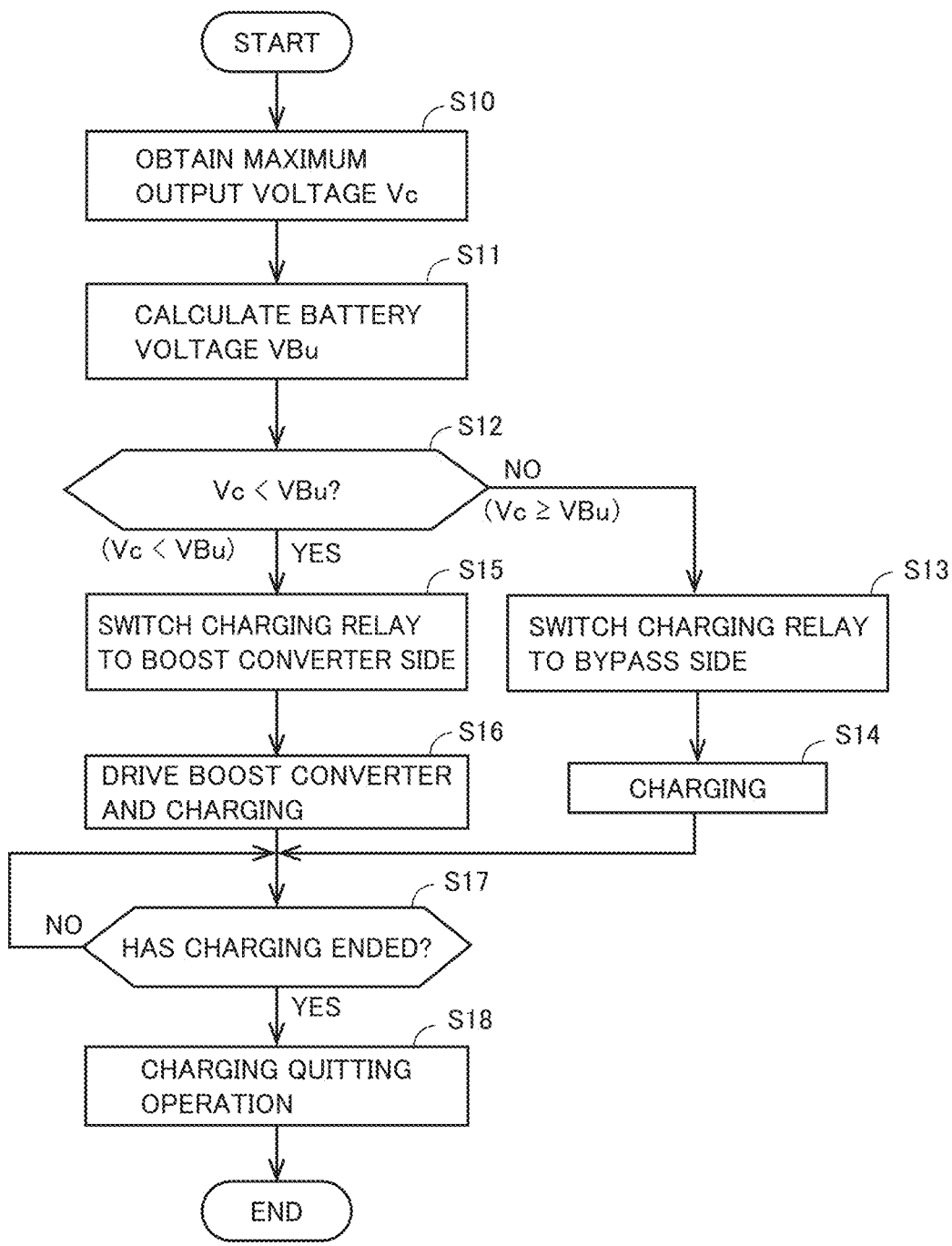
FIG. 5 is a flowchart showing overview of processing performed by ECU 70.

FIG. 5 is a flowchart showing overview of processing performed by ECU 70. The processing in this flowchart is performed when connector 81 is connected to DC inlet 31. When connector 81 is connected to DC inlet 31, initially, in step (the step being abbreviated as S below) 10, ECU 70 receives information from external charging facility 80 through CAN communication and/or PLC, and obtains maximum output voltage Vc of external charging facility 80 from the information. The process proceeds to S11.

In S11, ECU 70 calculates battery voltage VBu which represents the inter-terminal voltage at the time of end of charging of battery 10 based on the SOC at the time of end of charging of battery 10. ECU 70 calculates battery voltage VBu in accordance with the map that shows relation between the SOC and the inter-terminal voltage. The SOC at the time of end of charging of battery 10 is obtained, for example, based on the time period for charging, the amount of charging (Ah), and the SOC at the time of completion of charging set by the user as described above.

In following S12, ECU 70 compares magnitude of maximum output voltage Vc with magnitude of battery voltage VBu. When maximum output voltage Vc is equal to or higher than battery voltage VBu (Vc≥VBu), determination as NO is made and the process proceeds to S13. In S13, ECU 70 switches charging relay 30 to connect DC inlet 31 to bypass power line Lb and bypass power line Nb (see FIG. 3) and the process proceeds to S14. In S14, ECU 70 transmits a request for output of electric power to external charging facility 80 to start charging. Thereafter, the process proceeds to S17.

In S12, when maximum output voltage Vc is lower than battery voltage VBu (Vc<VBu), determination as YES is made and the process proceeds to S15. In S15, ECU 70 switches charging relay 30 to connect DC inlet 31 to power line La and power line Na (see FIG. 2) and the process proceeds to S16. In S16, ECU 70 transmits a request for output of electric power to external charging facility 80 and activates boost converter 20. Charging is thus started and thereafter the process proceeds to S17.

In S17, ECU 70 determines whether or not charging of battery 10 has ended. For example, when the user has set the SOC at the time of completion of charging and the SOC of battery 10 has attained to the SOC at the time of completion of charging, ECU 70 determines that charging has ended. When the time period for charging has been set and the set time period for charging has elapsed since start of charging, ECU 70 determines that charging has ended. When the amount of charging (Ah) has been set and the amount of charging since start of charging attains to the set amount of charging, ECU 70 determines that charging has ended. When charging of battery 10 has not ended, charging continues until charging ends. When charging of battery 10 ends, determination as YES is made and the process proceeds to S18.

After ECU 70 performs a charging quitting operation in S18, ECU 70 quits the present routine. The charging quitting operation is, for example, transmission of a request for stopping charging electric power to external charging facility 80 for stopping supply of electric power from external charging facility 80. When ECU 70 has switched charging relay 30 to connect DC inlet 31 to bypass power line Lb and bypass power line Nb in S13, ECU 70 switches charging relay 30 to connect DC inlet 31 to power line La and power line Na. When ECU 70 has activated boost converter 20 in S16, it deactivates boost converter 20.

According to the present embodiment, when maximum output voltage Vc is equal to or higher than battery voltage VBu, battery 10 is charged without activation of boost converter 20. Thus, when battery 10 can be charged without the use of the boost function of boost converter 20, charging is carried out without the use of boost converter 20. Consequently, battery 10 can be charged without loss in boost converter 20 and lowering in efficiency in charging can be suppressed.

In the present embodiment, when maximum output voltage Vc is equal to or higher than battery voltage VBu (Vc≥VBu) in S12, in S13, charging relay 30 is switched to connect DC inlet 31 to bypass power line Lb and power line Nb. When maximum output voltage Vc is higher than battery voltage VBu (Vc>VBu), however, charging relay 30 may be switched to connect DC inlet 31 to bypass power line Lb and bypass power line Nb. Then, when maximum output voltage Vc is equal to or lower than battery voltage VBu (Vc≤VBu), charging relay 30 is switched to connect DC inlet 31 to power line La and power line Na.

First Modification

An inter-terminal voltage VB of battery 10 varies, for example, depending on a temperature of battery 10. By way of example, during charging of battery 10, inter-terminal voltage VB of battery 10 tends to increase with lowering in temperature. Therefore, while maximum output voltage Vc is higher than battery voltage VBu and battery 10 is being charged without the use of boost converter 20, inter-terminal voltage VB is affected, for example, by the temperature. Consequently, inter-terminal voltage VB may become higher than battery voltage VBu calculated in accordance with the map. In this case, maximum output voltage Vc may become lower than inter-terminal voltage VB and charging may not be carried out. Alternatively, accuracy in calculation of battery voltage VBu may be lowered due to variation in condition such as aging of battery 10. Then, while maximum output voltage Vc is higher than battery voltage VBu and battery 10 is being charged without the use of boost converter 20, maximum output voltage Vc becomes lower than inter-terminal voltage VB. Consequently, charging may not be carried out. In a first modification, even when maximum output voltage Vc becomes lower than inter-terminal voltage VB during charging of battery 10 without the use of boost converter 20, battery 10 can be charged.

Figure 6:
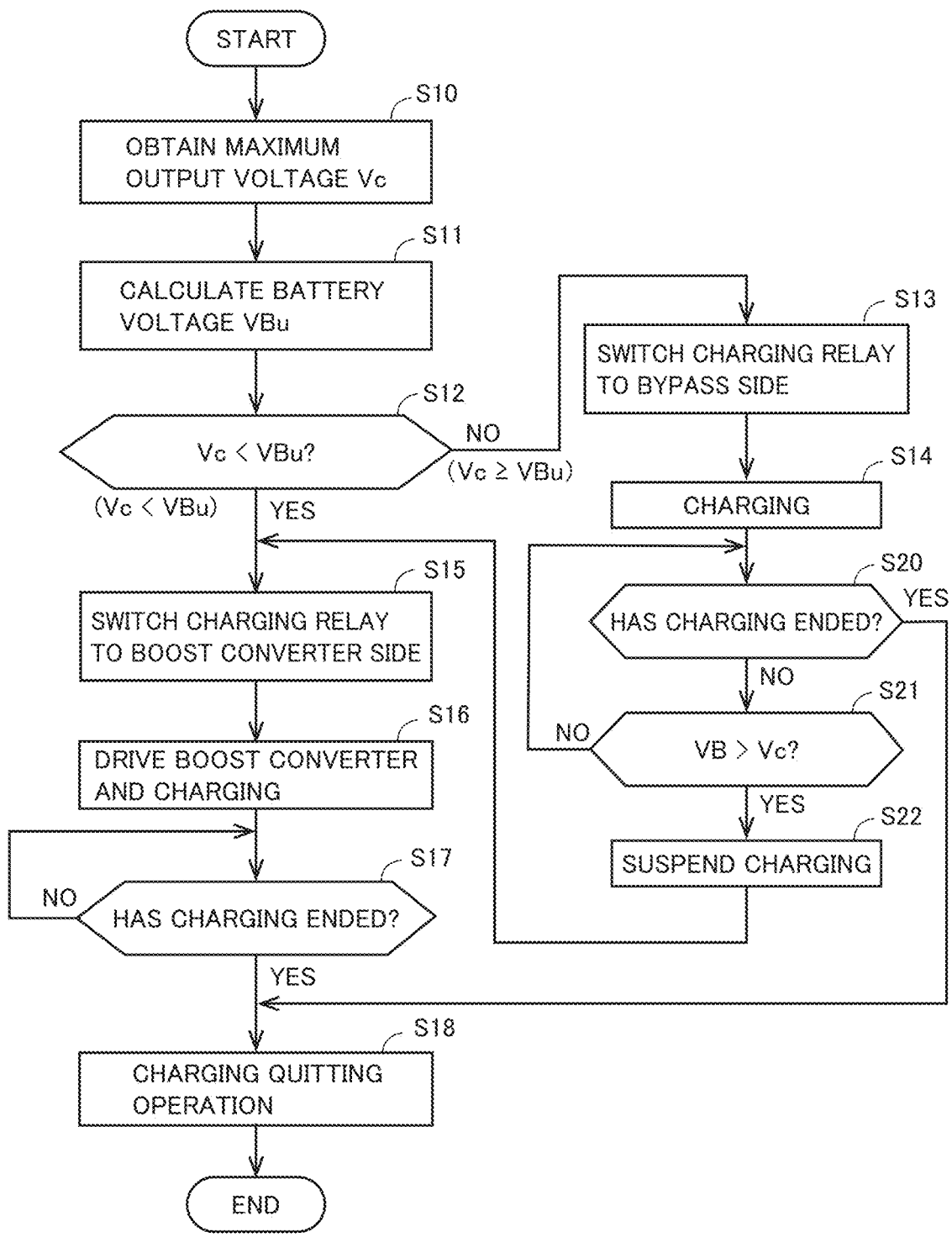
FIG. 6 is a flowchart showing overview of processing performed by ECU 70 in a first modification.

FIG. 6 is a flowchart showing overview of processing performed by ECU 70 in the first modification. The flowchart in FIG. 6 is different from the flowchart in FIG. 5 in addition of S20 to S22 to the flowchart in FIG. 5. S10 to S18 in the flowchart in FIG. 6 are the same as S10 to S18 in the flowchart in FIG. 5, although description thereof is not provided.

Referring to FIG. 6, in S14, after ECU 70 transmits a request for output of electric power to external charging facility 80 and starts charging, the process proceeds to S20. In S20, ECU 70 determines whether or not charging of battery 10 has ended. Processing in S20 is identical to the processing in S17. When charging of battery 10 ends and determination as YES is made in S20, the process proceeds to S18. After ECU 70 performs a charging quitting operation in S18, ECU 70 quits the present routine. When charging of battery 10 has not ended, determination as NO is made and the process proceeds to S21.

In S21, ECU 70 determines whether or not inter-terminal voltage VB of battery 10 detected by the voltage sensor of monitoring unit 11 is higher than maximum output voltage Vc. When inter-terminal voltage VB is equal to or lower than maximum output voltage Vc (VB≤Vc), the process returns to S20 and charging continues until charging ends. When inter-terminal voltage VB is higher than maximum output voltage Vc (VB>Vc), the process proceeds to S22.

In S22, ECU 70 suspends charging. Specifically, ECU 70 transmits a request for stopping charging electric power to external charging facility 80 to stop supply of electric power from external charging facility 80, and thereafter the process proceeds to S15. In S15, ECU 70 switches charging relay 30 to connect DC inlet 31 to power line La and power line Na (see FIG. 2) and the process proceeds to S16.

In this first modification, when battery 10 is being charged without the use of boost converter 20 and maximum output voltage Vc becomes lower than inter-terminal voltage VB, determination as YES is made in S21 Then, the process proceeds to S22 and charging is temporarily suspended. Thereafter, in S15, charging relay 30 is switched to connect DC inlet 31 to power line La and power line Na, and boost converter 20 boosts the voltage. Charging of battery 10 is thus resumed. Charging continues until charging of battery 10 ends in S17. Consequently, battery 10 is reliably charged.

Second Modification

When battery 10 is charged by using boost converter 20, efficiency in charging becomes poor due to loss in boost converter 20. Therefore, when charging of battery 10 continues with the use of boost converter 20 until the amount of charging (Ah) or the charging completion SOC set by the user is achieved, the time period for charging may become long. In a case where a fee for charging depends on the time period for charging, the longer time period for charging leads to a more expensive unit price of the fee per amount of charging. In a second modification, the unit price of the fee can be prevented from becoming expensive.

Figure 7:
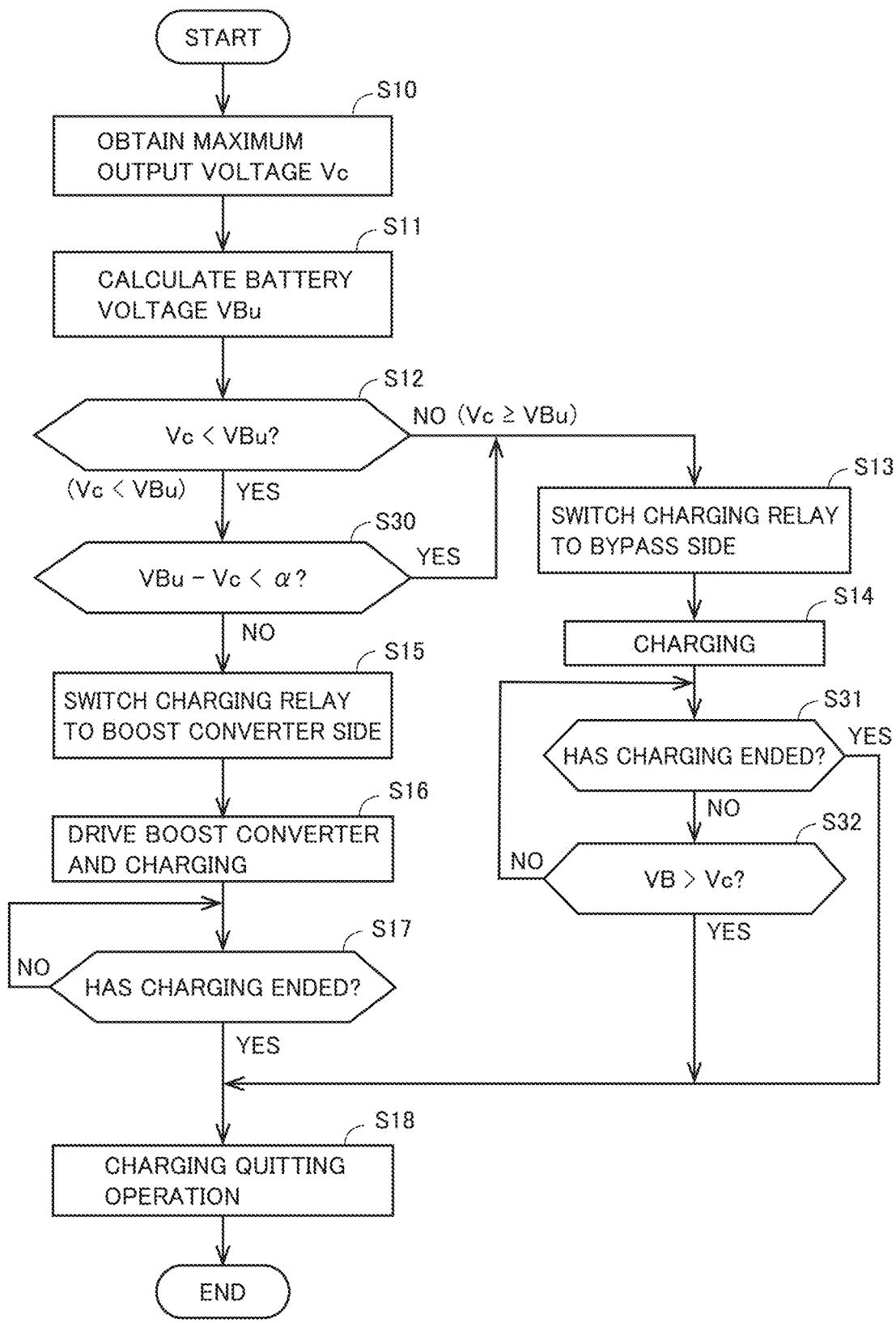
FIG. 7 is a flowchart showing overview of processing performed by ECU 70 in a second modification.

FIG. 7 is a flowchart showing overview of processing performed by ECU 70 in the second modification. The flowchart in FIG. 7 is different from the flowchart in FIG. 5 in addition of S30 to S32 to the flowchart in FIG. 5. S10 to S18 in the flowchart in FIG. 7 are the same as S10 to S18 in the flowchart in FIG. 5, although description thereof is not provided.

Referring to FIG. 7, in S12, when maximum output voltage Vc is lower than battery voltage VBu (Vc<VBu), determination as YES is made and the process proceeds to S30. In S30, ECU 70 determines whether or not "VBu−Vc" which is a difference between maximum output voltage Vc and battery voltage VBu is smaller than a prescribed value α. Prescribed value α corresponds to the "first prescribed value" in the present disclosure, and may be set, for example, to a value corresponding to 5% of battery voltage VBu. When relation of "VBu−Vc≥α" is satisfied and determination as NO is made, the process proceeds to S15. When relation of "VBu−Vc<α" is satisfied and determination as YES is made, the process proceeds to S13.

Thus, in the second modification, when the difference between maximum output voltage Vc and battery voltage VBu is smaller than prescribed value α (determination as YES in S30) in spite of maximum output voltage Vc being lower than battery voltage VBu (determination as YES in S12), the process proceeds to S13. Then, ECU 70 switches charging relay 30 to connect DC inlet 31 to bypass power line Lb and bypass power line Nb. Battery 10 is thus charged through the bypass path that bypasses boost converter 20, without boost by boost converter 20 of the voltage of electric power supplied from external charging facility 80.

In S31, ECU 70 determines whether or not charging of battery 10 has ended. Processing in S31 is identical to the processing in S17. When charging of battery 10 ends and determination as YES is made in S31, the process proceeds to S18. After ECU 70 performs the charging quitting operation in S18, ECU 70 quits the present routine. When charging of battery 10 has not ended, determination as NO is made and the process proceeds to S32.

In S32, ECU 70 determines whether or not inter-terminal voltage VB of battery 10 detected by the voltage sensor of monitoring unit 11 is higher than maximum output voltage Vc. When inter-terminal voltage VB is equal to or lower than maximum output voltage Vc (VB≤Vc), the process returns to S31 and charging continues until charging ends. When inter-terminal voltage VB is higher than maximum output voltage Vc (VB>Vc), the process proceeds to S18. After ECU 70 performs the charging quitting operation in S18, ECU 70 quits the present routine.

In this second modification, when the difference between maximum output voltage Vc and battery voltage VBu is smaller than prescribed value α in spite of maximum output voltage Vc being lower than battery voltage VBu, battery 10 is charged through the bypass path that bypasses boost converter 20 without activation of boost converter 20. Then, when charging of battery 10 proceeds and inter-terminal voltage VB of battery 10 becomes higher than maximum output voltage Vc, charging ends before the amount of charging (Ah) or the charging completion SOC set by the user is achieved. Therefore, the amount of charging (Ah) or the charging completion SOC set by the user is substantially achieved, without charging of battery 10 with the use of boost converter 20. Consequently, the time period for charging can be prevented from becoming longer and the unit price for the fee for charging can be prevented from becoming expensive. Magnitude of prescribed value α may be set as appropriate by the user. The SOC at the time of end of charging due to inter-terminal voltage VB becoming higher than maximum output voltage Vc is thus set to a value within a range allowable by a user who balances between the SOC and the fee for charging.

When the processing in S12 and the processing in S30 are integrated and relation of "VBu−Vc<α" is satisfied, the process proceeds to S13. When relation of "VBu−Vc<α" is not satisfied (VBu−Vc≥α), the process may proceed to S15.

Third Modification

Inter-terminal voltage VB of battery 10 varies, for example, depending on a temperature of battery 10. While maximum output voltage Vc is higher than battery voltage VBu and battery 10 is being charged without the use of boost converter 20, maximum output voltage Vc may become lower than inter-terminal voltage VB due to variation in inter-terminal voltage VB. Consequently, charging is not carried out or charging by using boost converter 20 is started, which leads to unstable charging. When charging is unstable, for example, the originally scheduled time period for charging may become longer. Alternatively, accuracy in calculation of battery voltage VBu may be lowered depending on the temperature of battery 10, and calculated battery voltage VBu may become lower than an actual inter-terminal voltage at the time of end of charging of the battery. When maximum output voltage Vc often becomes lower than inter-terminal voltage VB while battery 10 is being charged without the use of boost converter 20, charging is not carried out or charging with the use of boost converter 20 is started, which leads to unstable charging. When charging is unstable, for example, the originally scheduled time period for charging may become longer. In a third modification, stable charging can be facilitated.

Figure 8:
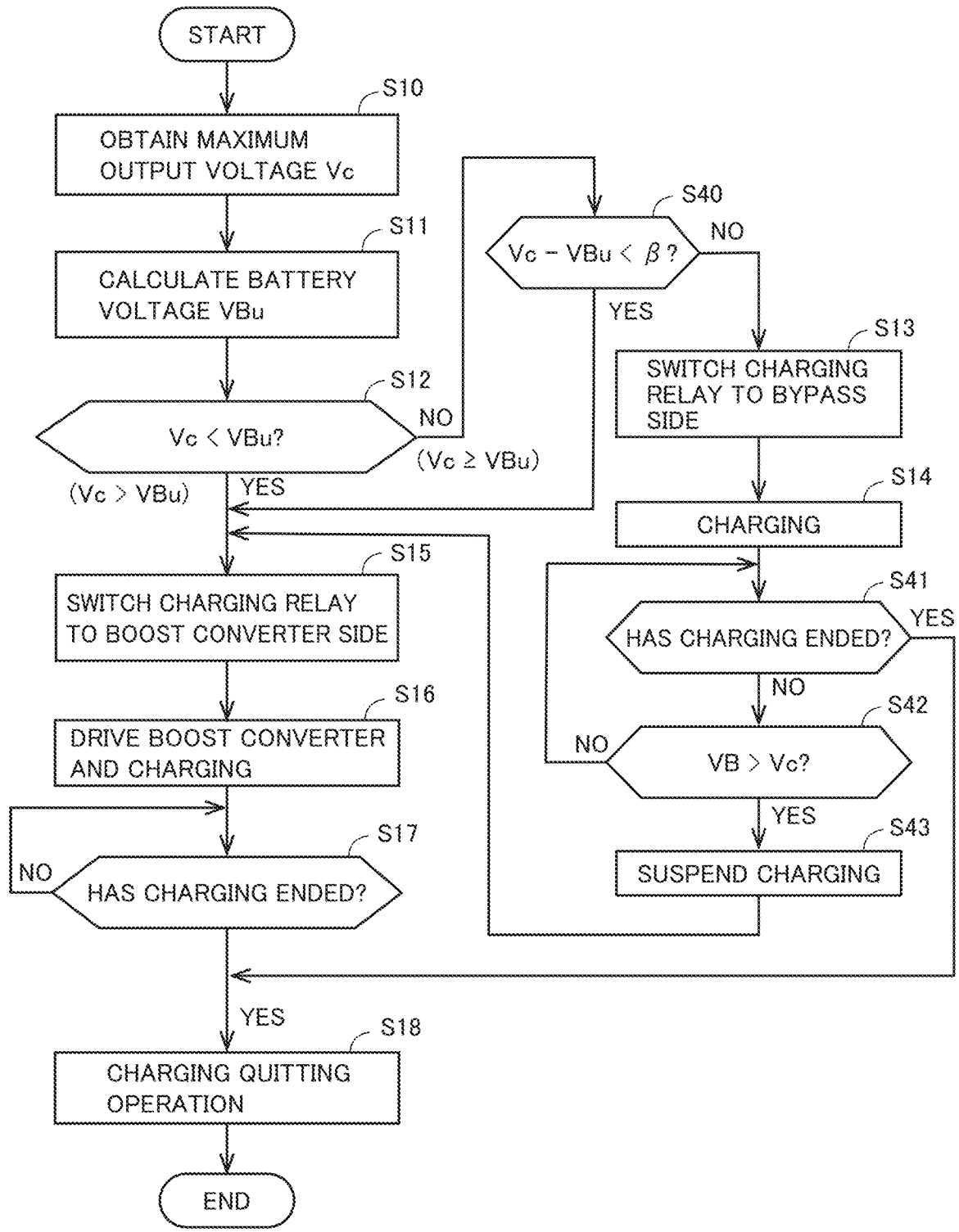
FIG. 8 is a flowchart showing overview of processing performed by ECU 70 in a third modification.

FIG. 8 is a flowchart showing overview of processing performed by ECU 70 in the third modification. The flowchart in FIG. 8 is different from the flowchart in FIG. 5 in addition of S40 to S43 to the flowchart in FIG. 5. S10 to S18 in the flowchart in FIG. 8 are the same as S10 to S18 in the flowchart in FIG. 5, although description thereof is not provided.

Referring to FIG. 8, in S12, when maximum output voltage Vc is equal to or higher than battery voltage VBu (Vc≥VBu), determination as NO is made and the process proceeds to S40. In S40, ECU 70 determines whether or not "Vc−VBu" which is a difference between maximum output voltage Vc and battery voltage VBu is smaller than a prescribed value β. Prescribed value β corresponds to the "second prescribed value" in the present disclosure, and may be set, for example, to a value corresponding to 5% of battery voltage VBu. When relation of "Vc−VBu<β" is satisfied and determination as YES is made, the process proceeds to S15. When relation of "Vc−VBu≥β" is satisfied and determination as NO is made, the process proceeds to S13.

Thus, in the third modification, when the difference between maximum output voltage Vc and battery voltage VBu is smaller than prescribed value β (determination as YES in S40) in spite of maximum output voltage Vc being higher than battery voltage VBu (determination as NO in S12), the process proceeds to S15. Then, ECU 70 switches charging relay 30 to connect DC inlet 31 to power line La and power line Na. Thus, the voltage of electric power supplied from external charging facility 80 is boosted by boost converter 20 and battery 10 is charged with electric power of the boosted voltage.

In S41, ECU 70 determines whether or not charging of battery 10 has ended. Processing in S41 is identical to the processing in S17. When charging of battery 10 ends and determination as YES is made in S41, the process proceeds to S18. After ECU 70 performs the charging quitting operation in S18, ECU 70 quits the present routine. When charging of battery 10 has not ended, determination as NO is made and the process proceeds to S42.

In S42, ECU 70 determines whether or not inter-terminal voltage VB of battery 10 detected by the voltage sensor of monitoring unit 11 is higher than maximum output voltage Vc. When inter-terminal voltage VB is equal to or lower than maximum output voltage Vc (VB≤Vc), the process returns to S41 and charging continues until charging ends. When inter-terminal voltage VB is higher than maximum output voltage Vc (VB>Vc), the process proceeds to S43. Then, after charging is suspended, the process proceeds to S15.

In this third modification, when the difference between maximum output voltage Vc and battery voltage VBu is smaller than prescribed value β in spite of maximum output voltage Vc being higher than battery voltage VBu, battery 10 is charged by using boost converter 20. While maximum output voltage Vc is higher than battery voltage VBu by prescribed value β, boost converter 20 is activated and charging is carried out. A frequency of a charging voltage becoming lower than inter-terminal voltage VB of battery 10 can thus be decreased. Consequently, stable charging can be facilitated.

Figure 9:
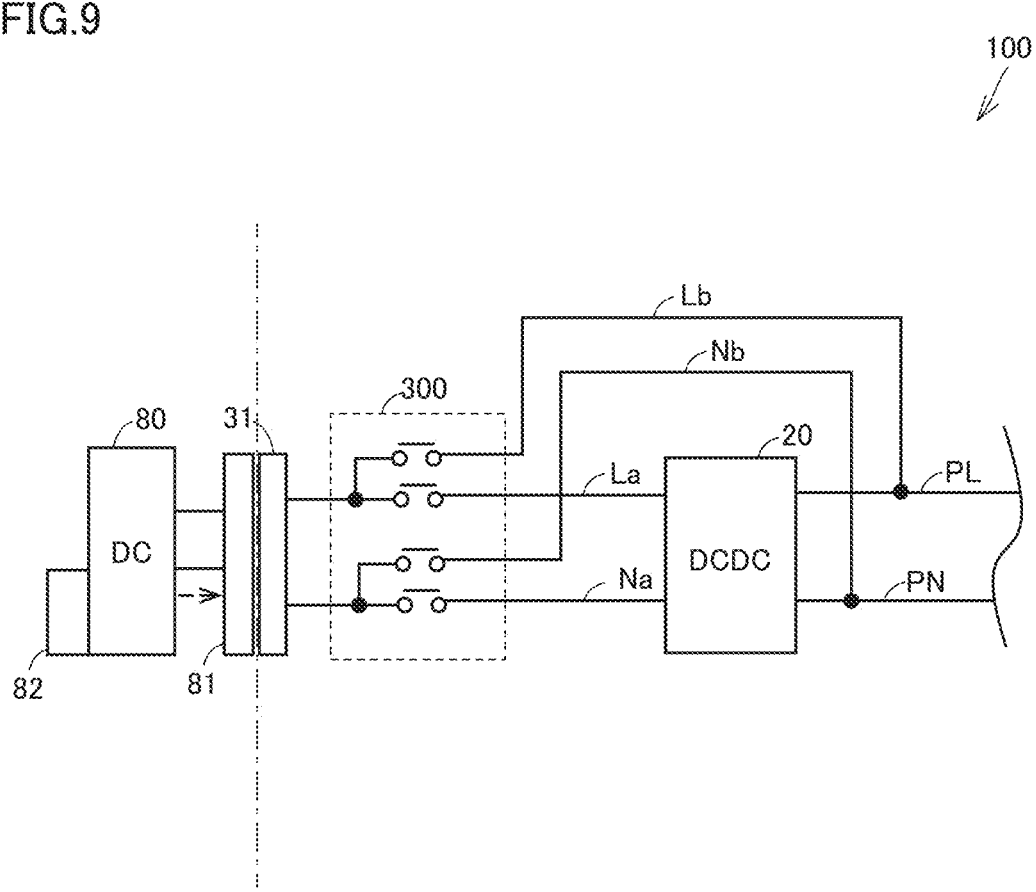
FIG. 9 is a diagram showing another exemplary configuration of a charging relay.

In the present embodiment, charging relay 30 is composed of c contact relay 30a and c contact relay 30b. The configuration of charging relay 30, however, is not limited as such. FIG. 9 is a diagram showing another exemplary configuration of the charging relay. As shown in FIG. 9, the charging relay may be a charging relay 300 composed of four a contact relays. Charging relay 300 is composed of four a contact relays. This configuration allows reliable electrical disconnection between battery 10 and DC inlet 31 when connector 81 is not connected to DC inlet 31 and all a contact relays are opened (OFF). In the present embodiment, in the charging quitting operation (S18), charging relay 30 is switched to connect DC inlet 31 to power line La and power line Na at the time of end of charging. When boost converter 20 is of an insulating type, electrical connection between battery 10 and DC inlet 31 can thus substantially be cut off owing to the insulation function. Even when boost converter 20 is of a non-insulating type, electrical connection between battery 10 and DC inlet 31 can substantially be cut off by a diode arranged in a positive electrode line of a power line pair that forms the connection. In the present embodiment, the inter-terminal voltage (the rated voltage or the nominal voltage) of battery 10 is set to 600 V, however, it may be set to 500 V, 700 V, or 800 V.

Though electrically powered vehicle 100 shown in FIG. 1 is a battery electric vehicle, a vehicle to which the present disclosure is applicable is not limited to electrically powered vehicle 100. The present disclosure is applicable, for example, also to a plug-in hybrid electric vehicle including an engine and a motor generator, an externally chargeable fuel cell electric vehicle including a storage battery, or an industrial vehicle such as a forklift.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An electrically powered vehicle including a power storage device chargeable with electric power supplied from an external power supply, the electrically powered vehicle comprising:
    a boost device configured to
        boost a voltage of the electric power supplied from the external power supply and supply electric power of the boosted voltage to the power storage device;
    a bypass path that bypasses the boost device, the bypass path being configured as a path through which the electric power supplied from the external power supply is supplied to the power storage device without being supplied to the boost device; and
    a controller configured to control charging of the power storage device, wherein
    the controller is configured to
        charge the power storage device by using the boost device in response to a maximum voltage of the electric power supplied from the external power supply being lower than an inter-terminal voltage of the power storage device at time of end of charging of the power storage device, and
        charge the power storage device through the bypass path in response to the maximum voltage being higher than the inter-terminal voltage at the time of end of charging, and
    the controller is configured to further charge the power storage device through the bypass path in response to the maximum voltage being lower than the inter-terminal voltage at the time of end of charging and a difference between the maximum voltage and the inter-terminal voltage at the time of end of charging being smaller than a first prescribed value.

2. The electrically powered vehicle according to claim 1, wherein
    the controller is configured to charge the power storage device by using the boost device in response to that the power storage device is being charged through the bypass path and
    the maximum voltage becomes lower than the inter-terminal voltage of the power storage device.

3. The electrically powered vehicle according to claim 1, wherein
    the external power supply is an external charging facility that supplies DC electric power to the electrically powered vehicle,
    the electrically powered vehicle comprises a charging relay configured to selectively switch a path for the DC electric power supplied from the external charging facility to a path through which the DC electric power is supplied to the boost device or the bypass path, and
    the controller includes
        an output voltage obtaining unit configured to obtain the maximum voltage of the electric power supplied from the external power supply, the output voltage obtaining unit configured for obtaining the maximum voltage based on information received from the external charging facility,
        an upper limit voltage calculator configured to calculate the inter-terminal voltage of the power storage device at the time of end of charging of the power storage device, the upper limit voltage calculator configured for calculating the inter-terminal voltage based on a state of charge (SOC) of the power storage device,
        a comparator configured to compare magnitude of the maximum voltage with magnitude of the inter-terminal voltage at the time of end of charging, and
        a switching unit configured to switch the charging relay in accordance with a result of comparison by the comparator.

4. The electrically powered vehicle according to claim 1, wherein the controller is configured to, in response to that
    the power storage device is being charged through the bypass path and
    the inter-terminal voltage of the power storage device becomes higher than the maximum voltage,
    end charging the power storage device through the bypass path before a charging completion state of charge (SOC) set by a user of the electrically powered vehicle is achieved.

5. The electrically powered vehicle according to claim 4, wherein the first prescribed value is set by a user of the electrically powered vehicle to a value corresponding to 5% of the inter-terminal voltage of the power storage device at the time of end of charging of the power storage device.

6. An electrically powered vehicle including a power storage device chargeable with electric power supplied from an external power supply, the electrically powered vehicle comprising:
    a boost device configured to
        boost a voltage of the electric power supplied from the external power supply and supply electric power of the boosted voltage to the power storage device;
    a bypass path that bypasses the boost device, the bypass path being configured as a path through which the electric power supplied from the external power supply is supplied to the power storage device without being supplied to the boost device; and
    a controller configured to control charging of the power storage device, wherein
    the controller is configured to
        charge the power storage device by using the boost device in response to a maximum voltage of the electric power supplied from the external power supply being lower than an inter-terminal voltage of the power storage device at time of end of charging of the power storage device, and charge the power storage device through the bypass path in response to the maximum voltage being higher than the inter-terminal voltage at the time of end of charging, and the controller is configured to further charge the power storage device by using the boost device in response to the maximum voltage being higher than the inter-terminal voltage at the time of end of charging and a difference between the maximum voltage and the inter-terminal voltage at the time of end of charging being smaller than a second prescribed value.

7. The electrically powered vehicle according to claim 6, wherein the controller is configured to charge the power storage device by using the boost device in response to that the power storage device is being charged through the bypass path and the maximum voltage becomes lower than the inter-terminal voltage of the power storage device.

8. The electrically powered vehicle according to claim 6, wherein the external power supply is an external charging facility that supplies DC electric power to the electrically powered vehicle, the electrically powered vehicle comprises a charging relay configured to selectively switch a path for the DC electric power supplied from the external charging facility to a path through which the DC electric power is supplied to the boost device or the bypass path, and the controller includes an output voltage obtaining unit configured to obtain the maximum voltage of the electric power supplied from the external power supply, the output voltage obtaining unit configured for obtaining the maximum voltage based on information received from the external charging facility, an upper limit voltage calculator configured to calculate the inter-terminal voltage of the power storage device at the time of end of charging of the power storage device, the upper limit voltage calculator configured for calculating the inter-terminal voltage based on a state of charge (SOC) of the power storage device, a comparator configured to compare magnitude of the maximum voltage with magnitude of the inter-terminal voltage at the time of end of charging, and a switching unit configured to switch the charging relay in accordance with a result of comparison by the comparator.

9. The electrically powered vehicle according to claim 6, wherein the second prescribed value is set by a user of the electrically powered vehicle to a value corresponding to 5% of the inter-terminal voltage of the power storage device at the time of end of charging of the power storage device.

10. A method of controlling charging of an electrically powered vehicle, the electrically powered vehicle including a power storage device chargeable by an external power supply provided outside the electrically powered vehicle, and a boost device that boosts a voltage of electric power supplied from the external power supply and supplies electric power of the boosted voltage to the power storage device, the method comprising:

comparing a maximum voltage of the electric power supplied from the external power supply with an inter-terminal voltage of the power storage device at time of end of charging of the power storage device;

charging the power storage device by activating the boost device in response to the maximum voltage being lower than the inter-terminal voltage at the time of end of charging; and charging the power storage device without activating the boost device in response to the maximum voltage being higher than the inter-terminal voltage at the time of end of charging, wherein the power storage device is charged by using the boost device in response to the maximum voltage being higher than the inter-terminal voltage at the time of end of charging and a difference between the maximum voltage and the inter-terminal voltage at the time of end of charging being smaller than a first prescribed value, or wherein the power storage device is charged without activating the boost device in response to the maximum voltage being lower than the inter-terminal voltage at the time of end of charging and the difference between the maximum voltage and the inter-terminal voltage at the time of end of charging being smaller than a second prescribed value.

11. The method according to claim 10, further comprising calculating the inter-terminal voltage at the time of end of charging of the power storage device based on a state of charge (SOC) of the power storage device at the time of end of charging.

12. The method according to claim 10, wherein the power storage device is charged by using the boost device in response to the maximum voltage being higher than the inter-terminal voltage at the time of end of charging and the difference between the maximum voltage and the inter-terminal voltage at the time of end of charging being smaller than the first prescribed value.

13. The method according to claim 12, wherein the first prescribed value is set by a user of the electrically powered vehicle to a value corresponding to 5% of the inter-terminal voltage of the power storage device at the time of end of charging of the power storage device.

14. The method according to claim 10, wherein the power storage device is charged without activating the boost device in response to the maximum voltage being lower than the inter-terminal voltage at the time of end of charging and the difference between the maximum voltage and the inter-terminal voltage at the time of end of charging being smaller than the second prescribed value.

15. The method according to claim 14, wherein the second prescribed value is set by a user of the electrically powered vehicle to a value corresponding to 5% of the inter-terminal voltage of the power storage device at the time of end of charging of the power storage device.

* * * * *